(12) United States Patent
Gobara (10) Patent No.: US 12,519,537 B2
(45) Date of Patent: Jan. 6, 2026

(54) SATELLITE SIGNAL RECEPTION DEVICE, CONTROL METHOD OF SATELLITE SIGNAL RECEPTION DEVICE, AND ELECTRONIC DEVICE

(71) Applicant: SEIKO EPSON CORPORATION, Tokyo (JP)

(72) Inventor: Naoki Gobara, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 339 days.

(21) Appl. No.: 18/183,722

(22) Filed: Mar. 14, 2023

(65) Prior Publication Data

US 2023/0299842 A1    Sep. 21, 2023

(30) Foreign Application Priority Data

Mar. 15, 2022    (JP) .................................. 2022-039995

(51) Int. Cl.
*H04B 7/185*    (2006.01)

(52) U.S. Cl.
CPC ..... *H04B 7/18513* (2013.01); *H04B 7/18519* (2013.01)

(58) Field of Classification Search
CPC .......... G01S 19/37; G01S 19/24; G01S 19/34; H04B 7/18513; H04B 7/18519
See application file for complete search history.

(56) References Cited

U.S. PATENT DOCUMENTS

| | | | |
|---|---|---|---|
| 8,384,592 B1 * | 2/2013 | Crary ..................... | G01S 19/37 |
| | | | 342/357.77 |
| 2010/0091614 A1 * | 4/2010 | Fujisawa ................. | G01S 19/35 |
| | | | 368/14 |

FOREIGN PATENT DOCUMENTS

| | | |
|---|---|---|
| JP | 2017-167045 A | 9/2017 |
| JP | 2019163997 A * | 9/2019 |

* cited by examiner

*Primary Examiner* — Ayman A Abaza
*Assistant Examiner* — Benjamin T. Ranew
(74) *Attorney, Agent, or Firm* — Oliff PLC (57) ABSTRACT

A baseband control unit operates a reception unit and stores a reception signal in a sampling memory unit, and then stops an operation of the reception unit and causes a correlation computation processing unit to compute a correlation value for searching for a position information satellite based on the stored reception data. The baseband control unit operates the reception unit and stores the reception data in a bank 0 in a part of a first period of periods continuous in order at time intervals of 20 ms, and stops the reception unit and causes the correlation computation processing unit to compute a correlation value for searching for and tracking the position information satellite based on the reception data stored in the bank 0 in a remaining period of 1 ms.

6 Claims, 5 Drawing Sheets

FIG. 12

SATELLITE SIGNAL RECEPTION DEVICE, CONTROL METHOD OF SATELLITE SIGNAL RECEPTION DEVICE, AND ELECTRONIC DEVICE The present application is based on, and claims priority from JP Application Serial Number 2022-039995, filed Mar. 15, 2022, the disclosure of which is hereby incorporated by reference herein in its entirety.

BACKGROUND

1. Technical Field

The present disclosure relates to, for example, a satellite signal reception device, a control method of the satellite signal reception device, and an electronic device.

2. Related Art

A known satellite signal reception device receives a satellite signal transmitted from a position information satellite such as a GPS satellite and acquires time information and current position information based on the received satellite signal.

In most cases, the satellite signal reception device is incorporated into a battery-operated portable or small electronic device, so it is necessary to suppress peak power. For this reason, it is conceivable to suppress peak power by time-divisionally driving a reception unit that receives a satellite signal and a baseband processing unit that processes the signal received by the reception unit (see, for example, the description in JP-A-2017-167045).

According to this technique, it is possible to reduce the peak power, but it is difficult to achieve both of search processing of searching for a satellite signal and tracking processing of tracking the satellite signal.

In addition, the satellite signal may be lost, for example, when the reception device moves during the tracking processing. In this case, it is necessary to not only stop the tracking processing and perform the search processing again, but also perform processing of decoding orbit information of the position information satellite again, which increases power consumption in total.

Thus, it is conceivable to provide a mode of searching for a new satellite signal while performing tracking processing (see, for example, the description in JP-A-2019-163997).

However, the technique described in JP-A-2019-163997 cannot reduce peak power. Consequently, there is a problem in that both of the search processing and the tracking processing cannot be performed while the peak power is reduced.

SUMMARY

A satellite signal reception device according to one aspect of the present disclosure includes a reception unit configured to receive a radio wave of a satellite signal transmitted from a position information satellite and output a reception signal, a storage unit configured to store the reception signal, a correlation computation processing unit configured to compute a correlation value for searching for or tracking the position information satellite based on the reception signal stored in the storage unit, and a control unit configured to control the reception unit, the storage unit, and the correlation computation processing unit, wherein the control unit, in a first period, operates the reception unit and stores the reception signal in the storage unit, in a second period after the first period, stops an operation of the reception unit and computes, by using the correlation computation processing unit, a correlation value for searching for the position information satellite based on the reception signal stored in the storage unit, in a part of a third period, operates the reception unit and stores the reception signal in the storage unit, in another part of the third period, stops the reception unit and computes, by using the correlation computation processing unit, a correlation value for searching for and tracking the position information satellite based on the reception signal stored, in a part of a fourth period, operates the reception unit and stores the reception signal in the storage unit, and, in another part of the fourth period, stops the reception unit and computes, by using the correlation computation processing unit, a correlation value for searching for and tracking the position information satellite based on the reception signal stored, the third period and the fourth period being consecutive in this order at a given time interval.

DESCRIPTION OF EXEMPLARY EMBODIMENTS

A satellite signal reception device according to an embodiment of the present disclosure will be described below with reference to the accompanying drawings.

Moreover, the embodiment described below is a suitable specific example, and various technically preferable limitations are applied, but the scope of the disclosure is not limited to these modes unless they are specifically described in the following description as limiting the disclosure.

Figure 1:
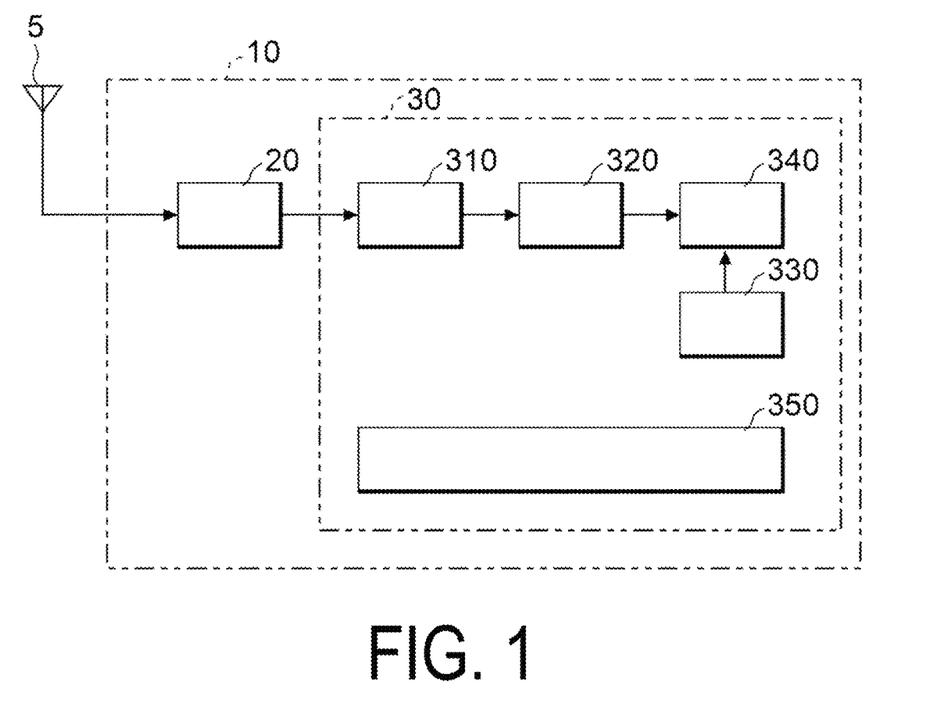
FIG. 1 is a block diagram illustrating a circuit configuration of a satellite signal reception device according to an embodiment.

FIG. 1 is a block diagram illustrating a circuit configuration of a satellite signal reception device 10. The satellite signal reception device 10 illustrated in FIG. 1 is a multi-GNSS receiver that can perform positioning using a plurality of satellite positioning systems. Note that GNSS is an abbreviation of global navigation satellite system.

The satellite signal reception device 10 is configured of one or more semiconductor integrated circuits and includes a reception unit 20 and a baseband unit 30.

The reception unit 20 is a circuit that receives a radio wave in a frequency band of a position information satellite using an antenna 5 and outputs a reception signal. The reception unit 20 includes a processing unit that receives and processes a satellite signal for each GNSS the signal of which can be received. The GNSSs the signal of which can be received include, for example, the GPS, Galileo, GLONASS, and Beidou. The processing unit corresponding to each GNSS the signal of which is received operates.

Note that the GNSS the signal of which is to be received may be selected by a user, or setting may be made such that the GNSS from which information has been successfully acquired at the previous time is preferably selected.

In addition, the single processing unit includes an amplifier circuit that amplifies a reception signal received by the antenna 5, a band-pass filter that removes, from the reception signal, a signal component outside a frequency band of a satellite signal, and a mixer circuit that mixes the reception signal with a local oscillator signal to convert the reception signal into a signal in an intermediate frequency band.

The baseband unit 30 includes a sampling unit 310, a sampling memory unit 320, a replica code generation unit 330, a correlation computation processing unit 340, and a baseband control unit 350. The baseband unit 30 is, for example, a processor such as a central processing unit (CPU) and can implement each unit as a module.

The sampling unit 310 includes, for example, an analog-digital converter and samples the reception signal output from the reception unit 20 at predetermined intervals and converts the reception signal into digital reception data.

The sampling memory unit 320 is an example of a storage unit and stores the reception data output from the sampling unit 310. Note that the sampling memory unit 320 may allocate a dedicated area for each GNSS or allocate an area shared by the plurality of GNSSs, and it may be also possible to change a size (volume size) of the reception data that can be stored. In the sampling memory unit 320, a size can be set so that at least the GNSS the signal of which is to be received can be handled.

The replica code generation unit 330 generates a replica of a PRN code corresponding to the type of the GNSS designated by the baseband control unit 350 and the position information satellite the signal of which is to be received.

The correlation computation processing unit 340 computes a correlation value between the reception data stored in the sampling memory unit 320 and the replica code generated by the replica code generation unit 330.

The baseband control unit 350 is an example of a control unit and performs roughly the following processing by controlling the reception unit 20, the sampling unit 310, the sampling memory unit 320, the replica code generation unit 330, and the correlation computation processing unit 340.

In detail, the baseband control unit 350 first causes the reception unit 20 to receive a radio wave from the GNSS satellite, causes the sampling unit 310 to sample a reception signal output from the reception unit 20 at predetermined intervals and convert the reception signal into digital reception data, and stores the reception data in the sampling memory unit 320.

Secondly, the baseband control unit 350 causes the replica code generation unit 330 to generate a replica code and causes the correlation computation processing unit 340 to compute a correlation value between the reception data stored in the sampling memory unit 320 and the replica code generated by the replica code generation unit 330 to perform search processing of searching for a satellite signal.

Thirdly, the baseband control unit 350 causes the replica code generation unit 330 to generate a replica code and causes the correlation computation processing unit 340 to compute a correlation value between the reception data stored in the sampling memory unit 320 and the replica code generated by the replica code generation unit 330 to perform tracking processing of tracking the searched satellite signal.

Note that in order to acquire position information from the GNSS satellite, it is necessary to receive at least 3 subframes (18 seconds) of the satellite signal for each satellite as described below. If there is no limitation on the storage size of the reception data in the sampling memory unit 320, the tracking processing can be performed using the reception data stored in the sampling memory unit 320 without suspension of the operation of the reception unit 20. However, in actuality, there is a limitation on the volume size of the sampling memory unit 320, and the cost and the like also need to be considered. Thus, the satellite signal reception device 10 performs correlation processing for tracking using the digitally converted reception data while the storage area of the sampling memory unit 320 is divided into a plurality of areas and the plurality of areas are switched.

Furthermore, the baseband control unit 350 performs processing of decoding a tracked satellite signal and processing of calculating time information and position information based on decoded satellite navigation information and code information included in the tracked signal.

Here, for convenience of explanation, the format of the signal transmitted from the GNSS satellite will be described with the GPS as an example. To receive the signal transmitted from the GPS satellite and calculate the current position from the reception signal, it is necessary to decode orbit information indicating the exact position of the satellite. Note that this orbit information is called ephemeris.

Figure 2:
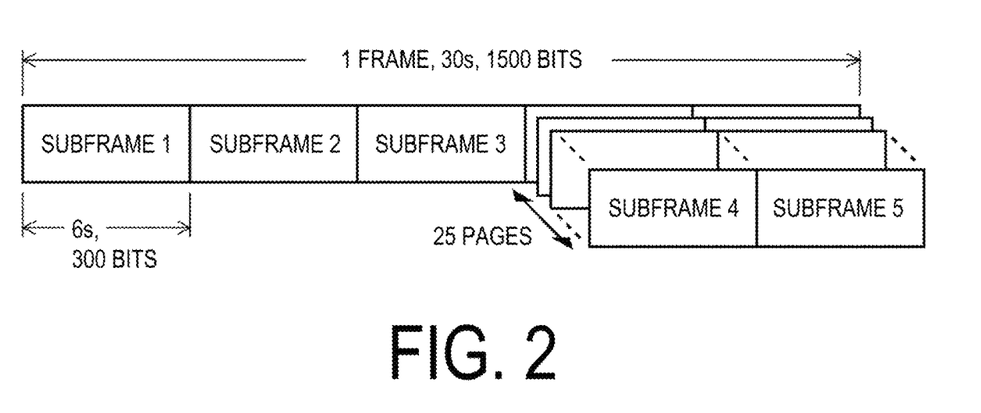
FIG. 2 is a diagram illustrating a format of navigation data transmitted from a position information satellite.

FIG. 2 is a diagram illustrating a format of navigation data transmitted from a position information satellite, specifically a GPS satellite.

The navigation data in one cycle is one frame of 1500 bits and is transmitted from the GPS satellite over 30 seconds. That is, the data rate of the navigation data is 50 bps.

The one frame includes five subframes from a subframe 1 to a subframe 5. The size of each subframe is 300 bits. Of the five subframes, the subframe 1 to the subframe 3 include clock correction information and ephemeris of the satellite, and the same contents are repeatedly transmitted from the GPS satellite every time.

Thus, in order to acquire all of the clock correction information and the ephemeris, it is necessary to receive the subframes 1 to the subframe 3 over 18 seconds. The data rate of the navigation data is 50 bps, which means that it takes 20 milliseconds (ms) to transmit one bit from the GPS satellite. Thus, in order to continuously decode the data transmitted from the GPS satellite, it is necessary to repeat a reception operation in part or whole of 20 ms at intervals of 20 ms.

Note that, data transmitted in each of the subframe 4 and the subframe 5 in one frame of the navigation data is divided into 25 pages, and different page contents in different frames are sequentially transmitted.

For continuous reception of the satellite signal in real time using the sampling memory unit 320, an operation of receiving and storing the reception signal and computation of a correlation value for search processing and tracking processing are performed in parallel. This will be sequentially described.

Note that, in the following figures, the operation of receiving the reception signal by the reception unit 20 is denoted as an RF unit, and the computation of the correlation value for the search processing and the tracking processing by the correlation computation processing unit 340 is denoted as a baseband unit abbreviated as a BB unit.

Figure 3:
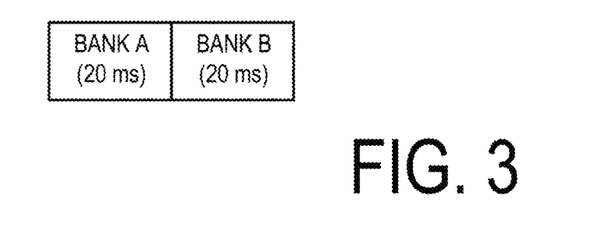
FIG. 3 is a diagram illustrating banks of a sampling memory unit in a first comparative example.
Figure 4:
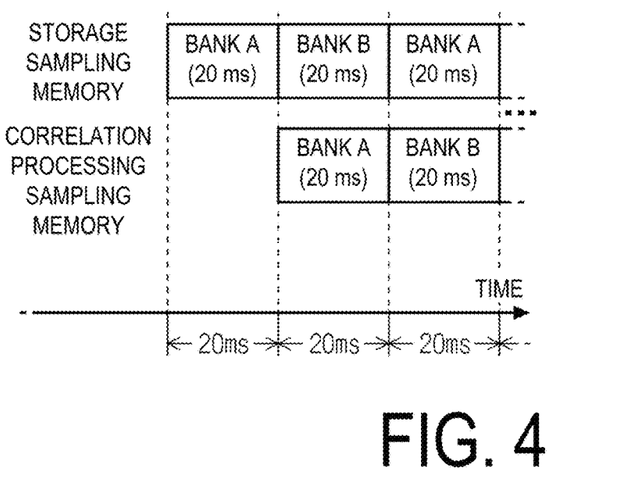
FIG. 4 is a diagram illustrating a timing of computing a correlation value using the banks in the first comparative example.

FIG. 3 is a diagram for describing banks that are sections of the storage capacity of the sampling memory unit 320 according to the first comparative example. FIG. 4 is a diagram illustrating a timing of computing the correlation value using the banks in the first comparative example.

As illustrated in FIG. 3, the sampling memory unit 320 is divided into banks A and B in the first comparative example. Each bank has a capacity for storing the digitally converted reception data for 20 milliseconds (ms).

In this first comparative example, as illustrated in FIG. 4, the bank A and the bank B are alternately switched every 20 ms between a storage sampling memory for storing the reception data and a correlation processing sampling memory used for computation of the correlation value, namely, correlation processing. By switching the banks A and B in this way, the correlation processing can be performed while the signal is continuously received from the satellite in real time.

Figure 5:
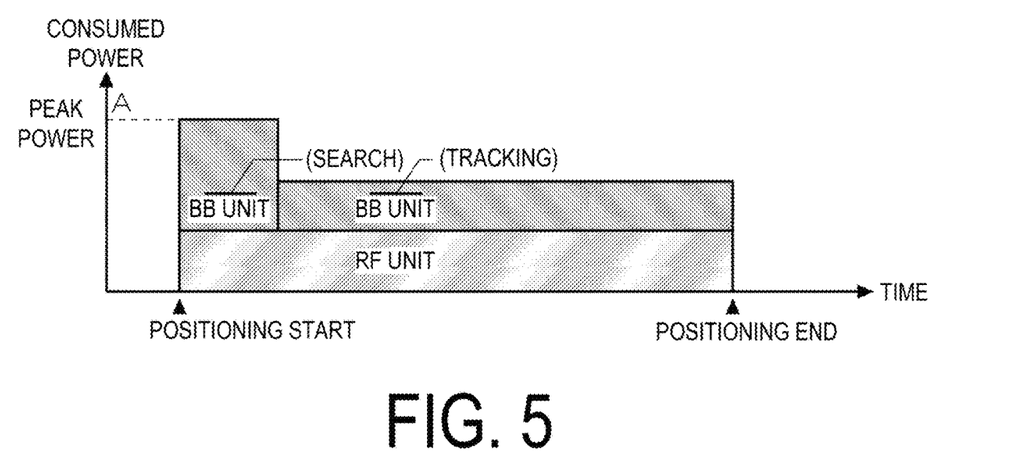
FIG. 5 is a diagram illustrating a relationship between a positioning operation and peak power in the first comparative example.

FIG. 5 is a diagram illustrating a relationship between a positioning operation and peak power in the first comparative example.

In the first comparative example, after positioning start, the correlation computation processing unit 340 performs the correlation processing on the reception signal received by the reception unit 20 to search for the satellite. Thereafter, the operation of continuously receiving, by the reception unit 20, the signal from the satellite in real time and storing the signal, and the operation of performing the correlation processing on the read reception data are performed in the banks A and B. The operations performed in the banks A and B are alternately switched.

The reception unit 20 consumes substantially fixed power. In the correlation processing performed by the correlation computation processing unit 340 of the baseband unit 30, the power for searching for the satellite signal tends to be higher than the power for tracking. Thus, in the first comparative example, the total value of the power consumed by the reception unit 20 and the power consumed by the search processing in the baseband unit 30 is the peak power. Note that the peak power in the first comparative example is denoted as value A.

Note that the power consumed for storing the reception data in one of the bank A or B, and the power consumed for reading the reception data from the other of the bank A or B are much smaller than the power consumed by the reception unit 20 and the power consumed by the baseband unit 30 and thus are ignored.

In the first comparative example, since the peak power is high, only few types of batteries can be used in the satellite signal reception device 10. Batteries that can support high peak power are typically expensive and difficult to obtain. Thus, a second comparative example in which peak power is lower and the device is driven by a less expensive battery than in the first comparative example will be described.

Figure 6:
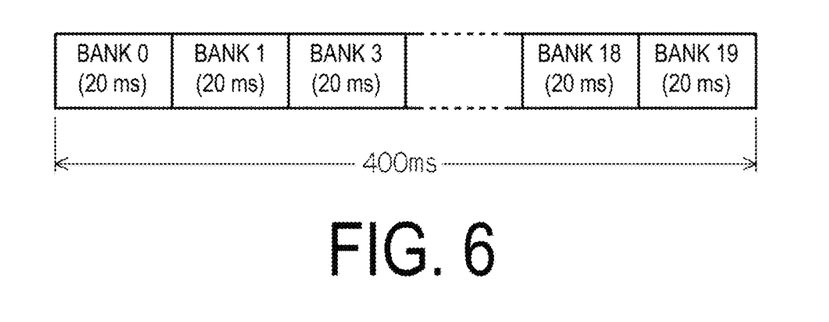
FIG. 6 is a diagram illustrating banks of a sampling memory unit in a second comparative example.
Figure 7:
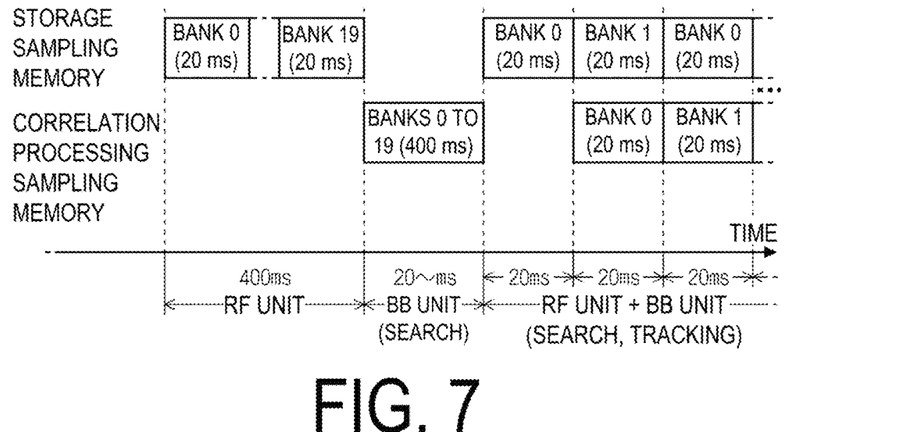
FIG. 7 is a diagram illustrating a timing of computing a correlation value using the banks in the second comparative example.

FIG. 6 is a diagram for describing banks in a sampling memory unit 320 according to the second comparative example. FIG. 7 is a diagram illustrating a timing of computing a correlation value using the banks in the second comparative example.

As illustrated in FIG. 6, in the second comparative example, the storage area of the sampling memory unit 320 is divided into 20 areas of a bank 0 to a bank 19. Each bank has a capacity for storing the digitally converted reception data for 20 milliseconds (ms).

As illustrated in FIG. 7, in the second comparative example, the reception unit 20 first operates, and the digitally converted reception data for 400 ms is stored from the bank 0 to the bank 19 of the sampling memory unit 320. When the reception data for 400 ms is stored, the operation of the reception unit 20 is stopped, and the correlation computation processing unit 340 performs correlation processing. By this correlation processing, the GPS satellite is searched for.

The time required for this correlation processing depends on the intensity of the reception signal. Specifically, the time for the correlation processing and the search time become shorter in an environment where the intensity of the reception signal is strong, such as an outdoor, and, in contrast, the time for the correlation processing and the search time become longer in an environment where the intensity is weak, such as an indoor.

Note that the time for the correlation processing also depends on the operation speed of the baseband unit 30, in other words, the clock speed. When the processing speed for computing the correlation value is fast, more satellites can be searched for in a short period of time.

When the satellite search ends, the reception data is decoded, and the position of the satellite is determined, reception by the reception unit 20 and tracking processing by the baseband unit 30 are performed in parallel for reception of the signal from the satellite in real time.

Figure 8:
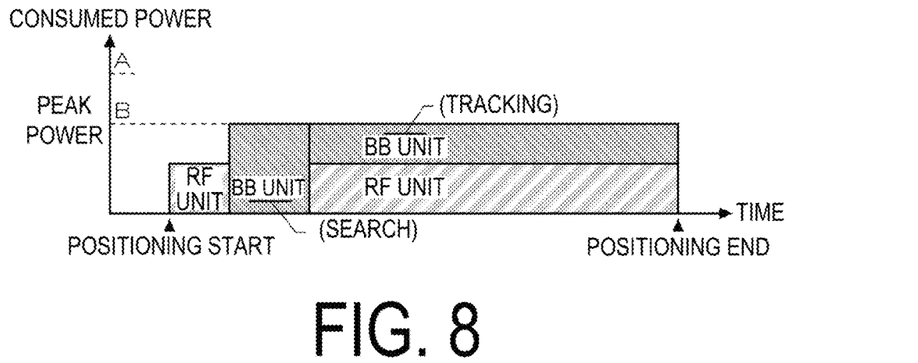
FIG. 8 is a diagram illustrating a relationship between a positioning operation and peak power in the second comparative example.

FIG. 8 is a diagram illustrating a relationship between a positioning operation and peak power in the second comparative example. In the second comparative example, after the reception data is stored in the banks 0 to 19, the operation of the reception unit 20 is suspended, and the baseband unit 30 searches for the satellite by the correlation processing. Thus, the peak power is suppressed as compared to the first comparative example by an amount corresponding to the suspension of the operation of the reception unit 20. Note that the peak power in the second comparative example is a value B (<A).

In the second comparative example, the processing of the reception unit 20 and the correlation processing for searching for the satellite signal in the baseband unit 30 are not simultaneously performed. Thus, a new satellite cannot be searched for during the tracking processing. That is, when the environment changes to one in which the intensity of the reception signal is weak due to movement of the satellite signal reception device 10, more specifically, when the arm wearing a wristwatch incorporated with the satellite signal reception device 10 is moved down and the satellite signal is lost, the satellite cannot be captured again.

In this case, in order to capture the satellite again, the baseband control unit 350 needs to cause the correlation computation processing unit 340 to temporarily stop the tracking processing, store the reception data from the satellite again in the sampling memory unit 320, and cause the correlation computation processing unit 340 to perform the search processing again. Since the continuous navigation data cannot be decoded due to the stop of the tracking processing, the decoding processing needs to be performed again, which extends the time for calculating the position and imposes inconvenience.

Thus, in the embodiment, search is performed even during tracking while peak power is suppressed by the following method.

First, in the embodiment, the storage area of the sampling memory unit 320 is divided into 20 areas from a bank 0 to a bank 19 in a manner similar to the second comparative example. Similarly, each bank has a capacity for storing the digitally converted reception data for 20 milliseconds (ms).

Figure 9:
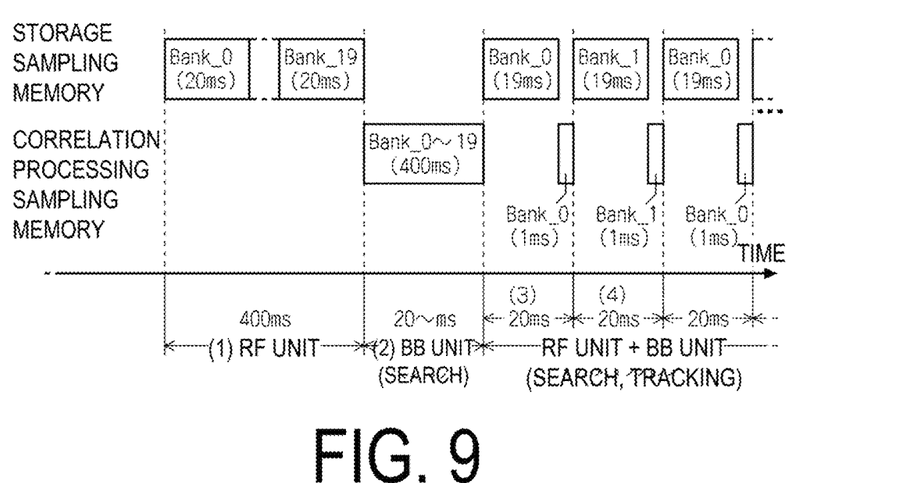
FIG. 9 is a diagram illustrating a timing of computing a correlation value using banks in the embodiment.
Figure 10:
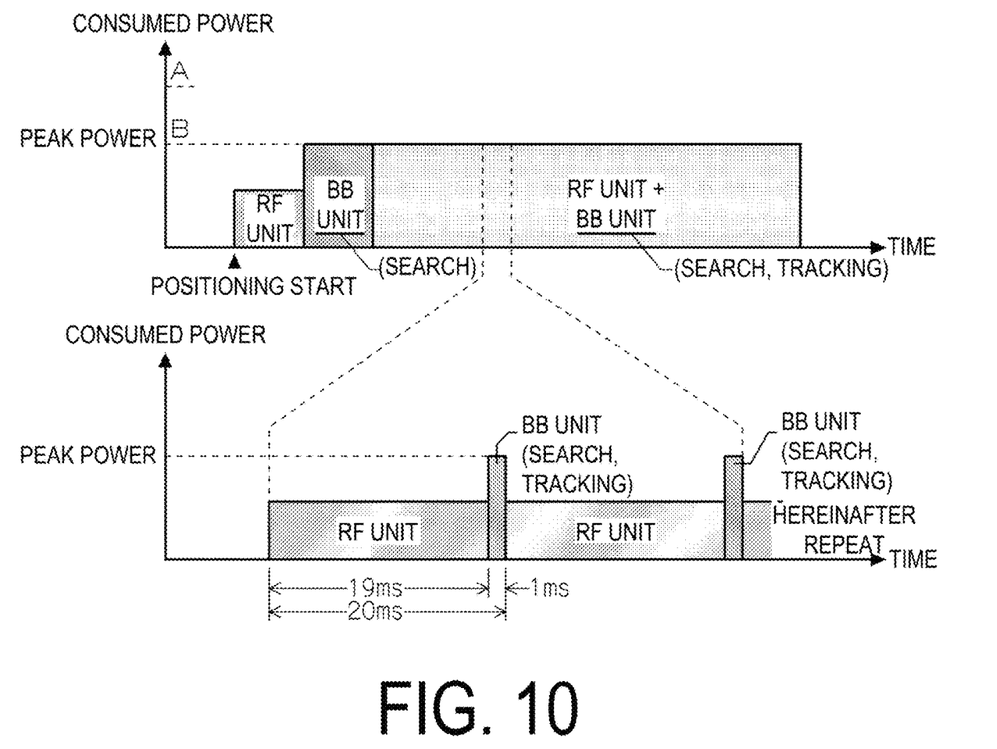
FIG. 10 is a diagram illustrating a relationship between a positioning operation and peak power in the embodiment.

FIG. 9 is a diagram illustrating a timing of a positioning operation in the embodiment. FIG. 10 is a diagram illustrating a relationship between the positioning operation and peak power in the embodiment.

In the embodiment, an operation of the reception unit 20 and an operation of the baseband unit 30 at the time of positioning start are the same as those of the second comparative example. In detail, the baseband control unit 350 operates the reception unit 20, stores the digital reception data for 400 ms in the banks 0 to 19 of the sampling memory unit 320, stops the operation of the reception unit 20, and causes the correlation computation processing unit 340 to perform the correlation processing using the stored reception data. These operations are the same as those of the second comparative example. By this correlation processing, the GPS satellite is searched for.

Note that a period in which the baseband control unit 350 operates the reception unit 20 at the time of the positioning start is an example of a first period indicated by (1) in FIG. 9, and a period in which the baseband control unit 350 stops the operation of the reception unit 20 and causes the correlation computation processing unit 340 to perform the correlation processing using the stored reception data is an example of a second period indicated by (2) in FIG. 9.

Next, in the embodiment, tracking processing after the search is different from that of the second comparative example.

For the tracking, the baseband control unit 350 performs the following control at intervals of 20 ms. Note that, as described above, 20 ms is a period in which one bit of data is transmitted from the GPS satellite, and an operation is repeated with 20 ms as a unit for continuous reception of the navigation data.

Of the reception data for 20 ms, the baseband control unit 350 first stores the reception data for 19 ms in the bank 0. After the reception data for 19 ms is stored, the baseband control unit 350 stops the operation of the reception unit 20. The baseband control unit 350 also causes the correlation computation processing unit 340 to perform the search processing and the tracking processing using the reception data for 19 ms stored in the bank 0. Note that the search processing and the tracking processing by the correlation computation processing unit 340 are performed in 1 ms in which the operation of the reception unit 20 is stopped.

A first period defined with 20 ms as a unit is an example of a third period indicated by (3) in FIG. 9.

Thereafter, the baseband control unit 350 operates the reception unit 20 again and stores, in the bank 1, the reception data for 19 ms in the reception data for 20 ms. After the reception data for 19 ms is stored, the baseband control unit 350 stops the operation of the reception unit 20 and causes the correlation computation processing unit 340 to perform the search processing and the tracking processing using the reception data for 19 ms stored in the bank 1.

A second time period defined with 20 ms as a unit is an example of a fourth period indicated by (4) in FIG. 9.

Hereinafter, the baseband control unit 350 performs such an operation while alternately switching the banks 0 and 1.

As illustrated in FIGS. 9 and 10, in the embodiment, the reception by the reception unit 20 and the correlation processing by the baseband unit 30 are not simultaneously performed, and thus the peak power is suppressed to the value B in a manner similar to the second comparative example. In detail, in the embodiment, the peak power is suppressed to the value B, which is consumed by the correlation processing for the search in the baseband unit 30 after the positioning start. In addition, unlike the second comparative example, the search processing can be performed even during the tracking processing in the embodiment.

In the present embodiment, not the reception data for 20 ms, but the reception data for a shorter period, i.e., 19 ms is used. This means reduction in the reception data used for the correlation processing, which consequently decreases the process gain of the replica correlation and decreases the reception sensitivity of the GPS signal.

Figure 11:
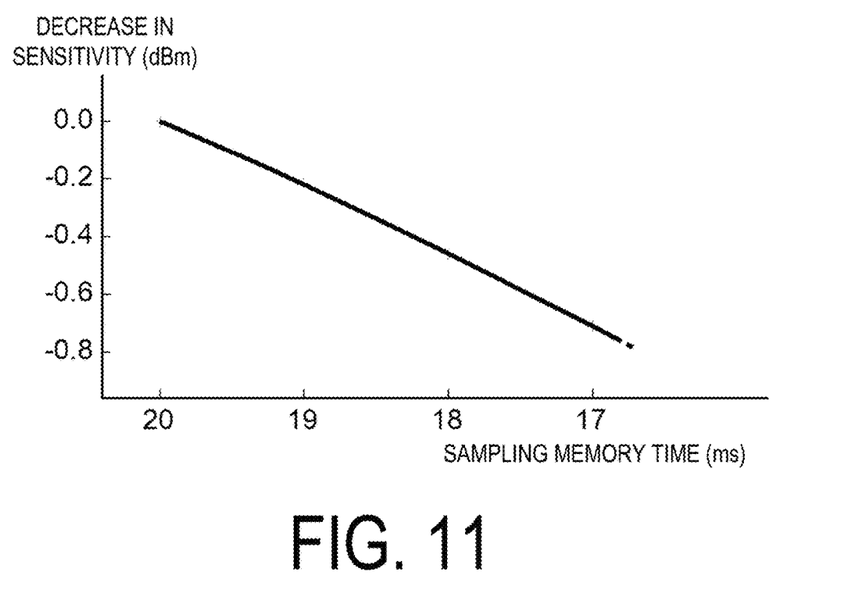
FIG. 11 is a graph illustrating decrease in reception sensitivity in the embodiment.

FIG. 11 is a graph showing a result of simulating how the sensitivity decreases when the sampling time is gradually shortened from 20 ms in a case where the reception sensitivity when the sampling time of the reception signal is 20 ms is assumed to be 0 dBm.

Note that the process gain P_Gain is expressed by Equation 1 below.

[Equation 1]

$$P\_Gain = 10 \cdot \log_{10}(Ct) \quad (1)$$

In Equation 1, Ct is the coherence time and is the sampling time (ms) of the sampling memory unit 320.

In the embodiment, the sampling time is 19 ms, and the reception sensitivity decreases by 0.22 dBm as compared to a case where the sampling time is 20 ms. However, even when the reception signal is weakened, the satellite can be searched for even during the tracking processing with the peak power suppressed.

Note that the sampling time is 19 ms in the embodiment, but the sampling time may be shortened from 19 ms in units of 1 ms. When the sampling time is shortened, the reception sensitivity decreases due to decrease in the process gain, but the search capability increases because the time for the correlation processing increases. Thus, the reception sensitivity and the search capability are in a trade-off relationship.

Next, an electronic device provided with the satellite signal reception device 10 according to the embodiment will be described.

Figure 12:
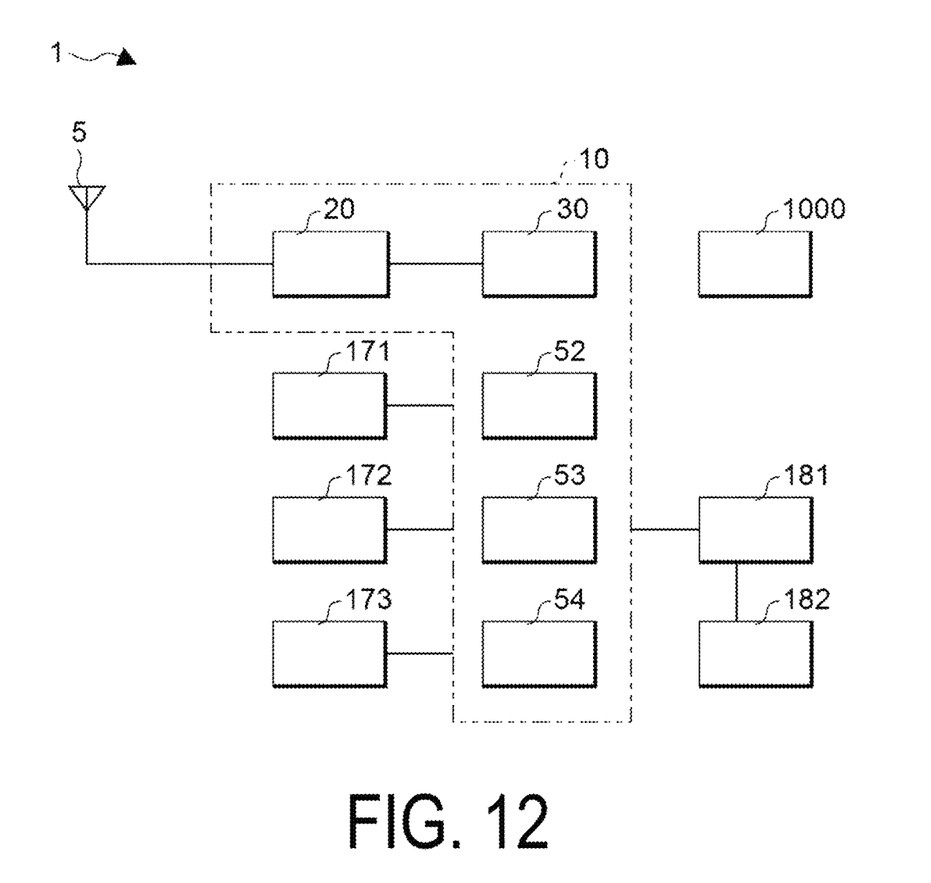
FIG. 12 is a diagram illustrating a configuration of an electronic device including a satellite signal reception device.

FIG. 12 is a block diagram illustrating a circuit configuration of an electronic clock 1 being an example of the electronic device.

The electronic clock 1 includes, in addition to the satellite signal reception device 10 according to the embodiment, an antenna 5, a timer 171, a storage device 172, an input device 173, a drive mechanism 181, a display device 182, and a battery 1000.

The battery 1000 is a power source for driving the electronic clock 1 including the satellite signal reception device 10. The baseband unit 30 of the electronic clock 1 is a processor such as a CPU and, by executing various programs stored in the storage device 172, constructs the following functions, in addition to the functions of controlling the reception unit 20 of the satellite signal reception device 10 and the correlation computation processing unit 340 omitted in

FIG. 12.

In other words, in the baseband unit 30, a time zone setting unit 52, a time correction unit 53, and a display control unit 54 are constructed.

The time zone setting unit 52 sets time zone data based on position information obtained based on a processing result by the satellite signal reception device 10. The time correction unit 53 corrects time data based on time information obtained based on a processing result by the satellite signal reception device 10 and the time zone data set by the time zone setting unit 52. The display control unit 54 controls an operation of the drive mechanism 181 and controls display contents of the display device 182.

The timer 171 includes, for example, a crystal oscillator, and updates the time data using a reference signal based on an oscillation signal of the crystal oscillator. The input device 173 is an operation element such as a button or a crown. An operation signal generated by operating the operation element is supplied to the control circuit 50.

Although the electronic clock 1 has been described as an example of the electronic device, the electronic device is not limited to the electronic clock 1 and other examples of the electronic device include a wearable terminal, a smartphone, a tablet terminal, a portable navigation device, a car navigation device, and a personal computer.

Preferred aspects of the present disclosure are understood from the above description, as follows. In the following, in order to facilitate understanding of each of the aspects, the reference signs of the drawings are provided in parentheses for convenience, but the present disclosure is not intended to be limited to the illustrated aspects.

A satellite signal reception device (10) according to one aspect (aspect 1) includes a reception unit (20) configured to receive a radio wave of a satellite signal transmitted from a position information satellite and output a reception signal, a storage unit (320) configured to store the reception signal, a correlation computation processing unit (340) configured to compute a correlation value for searching for or tracking the position information satellite based on the reception signal stored in the storage unit (320), and a control unit (350) configured to control the reception unit (20), the storage unit (320), and the correlation computation processing unit (340), wherein the control unit (350), in a first period (1), operates the reception unit (20) and stores the reception signal in the storage unit (320), in a second period (2) after the first period (1), stops an operation of the reception unit (20) and computes, by using the correlation computation processing unit (340), a correlation value for searching for the position information satellite based on the reception signal stored in the storage unit (320), in a part of a third period (3), operates the reception unit (20) and stores the reception signal in the storage unit (320), in another part of the third period (3), stops the reception unit (20) and computes, by using the correlation computation processing unit (340), a correlation value for searching for and tracking the position information satellite based on the reception signal stored, in a part of a fourth period (4), operates the reception unit (20) and stores the reception signal in the storage unit (320), and, in another part of the fourth period (4), stops the reception unit (20) and computes, by using the correlation computation processing unit (340), a correlation value for searching for and tracking the position information satellite based on the reception signal stored, the third period (3) and the fourth period (4) being consecutive in this order at a given time interval.

According to aspect 1, both the search processing and the tracking processing can be performed while the peak power is suppressed.

In the satellite signal reception device (10) according to a specific mode (aspect 2) of aspect 1, a storage area of the storage unit (320) is divided into a first bank and a second bank, and the control unit (350) stores the reception signal in the first bank in the part of the third period (3), and stores the reception signal in the second bank in the part of the fourth period (4).

In the satellite signal reception device (10) according to a specific mode (aspect 3) of aspect 2, the predetermined time interval is 20 milliseconds.

A control method of a satellite signal reception device (10) according to another aspect (aspect 4), the satellite signal reception device (10) including a reception unit (20) configured to receive a radio wave of a satellite signal transmitted from a position information satellite and output a reception signal, a storage unit (320) configured to store the reception signal, a correlation computation processing unit (340) configured to compute a correlation value for searching for or tracking the position information satellite based on the reception signal stored in the storage unit (320), and a control unit (350) configured to control the reception unit (20), the storage unit (320), and the correlation computation processing unit (340), the control method includes, by the control unit (350), in a first period (1), operating the reception unit (20) and storing the reception signal in the storage unit (320), in a second period (2) after the first period (1), stopping an operation of the reception unit (20) and computing, by using the correlation computation processing unit (340), a correlation value for searching for the position information satellite based on the reception signal stored in the storage unit (320), in a part of a third period (3), operating the reception unit (20) and storing the reception signal in the storage unit (320), in another part of the third period (3), stopping the reception unit (20) and computing, by using the correlation computation processing unit (340), a correlation value for searching for and tracking the position information satellite based on the reception signal stored, in a part of a fourth period (4), operating the reception unit (20) and storing the reception signal in the storage unit (320), and, in another part of the fourth period (4), stopping the reception unit (20) and computing, by using the correlation computation processing unit (340), a correlation value for searching for and tracking the position information satellite based on the reception signal stored, the third period (3) and the fourth period (4) being consecutive in this order at a given time interval.

According to aspect 4, both the search processing and the tracking processing can be performed while the peak power is suppressed.

An electronic device according to aspect 5 includes the satellite signal reception device (10) according to aspect 1, 2, or 3. According to aspect 5, both the search processing and the tracking processing can be performed while the peak power is suppressed.

An electronic device according to aspect 6 is the electronic device according to aspect 5 including a battery configured to drive the satellite signal reception device.

What is claimed is:

1. A satellite signal reception device comprising:
   a circuit configured to function as a reception unit that receives a radio wave of a satellite signal transmitted from a position information satellite and output a reception signal; and
   a processor configured to function as:
   a storage unit that stores the reception signal;
   a correlation computation processing unit that computes a correlation value for searching for or tracking the position information satellite based on the reception signal stored in the storage unit; and a control unit that controls the reception unit, the storage unit, and the correlation computation processing unit, wherein the control unit in a first period, operates the reception unit and stores the reception signal in the storage unit, in a second period after the first period, stops an operation of the reception unit and computes, by using the correlation computation processing unit, a correlation value for searching for the position information satellite based on the reception signal stored in the storage unit, in a part of a third period, operates the reception unit and stores the reception signal in the storage unit, in another part of the third period, stops the reception unit and computes, by using the correlation computation processing unit, a correlation value for searching for and tracking the position information satellite based on the reception signal stored, in a part of a fourth period, operates the reception unit and stores the reception signal in the storage unit, and in another part of the fourth period, stops the reception unit and computes, by using the correlation computation processing unit, a correlation value for searching for and tracking the position information satellite based on the reception signal stored, the third period and the fourth period being consecutive in this order at a given time interval, a time duration of the part of the third period is same as a time duration of the part of the fourth period, a time duration of the other part of the third period is same as a time duration of the other part of the fourth period, the time duration of the part of the third period and the time duration of the part of the fourth period is shorter than a time duration of the first period, and the time duration of the other part of the third period and the time duration of the other part of the fourth period is shorter than a time duration of the second period.

2. The satellite signal reception device according to claim 1, wherein a storage area of the storage unit is divided into a first bank and a second bank, and the control unit stores the reception signal in the first bank in the part of the third period, and stores the reception signal in the second bank in the part of the fourth period.

3. The satellite signal reception device according to claim 2, wherein the given time interval is 20 milliseconds.

4. A control method of a satellite signal reception device, the satellite signal reception device including a circuit configured to function as a reception unit that receives a radio wave of a satellite signal transmitted from a position information satellite and output a reception signal, and a processor configured to function as:

a storage unit that stores the reception signal, a correlation computation processing unit that computes a correlation value for searching for or tracking the position information satellite based on the reception signal stored in the storage unit, and a control unit that controls the reception unit, the storage unit, and the correlation computation processing unit, the control method comprising:

by the control unit, in a first period, operating the reception unit and storing the reception signal in the storage unit;

in a second period after the first period, stopping an operation of the reception unit and computing, by using the correlation computation processing unit, a correlation value for searching for the position information satellite based on the reception signal stored in the storage unit;

in a part of a third period, operating the reception unit and storing the reception signal in the storage unit;

in another part of the third period, stopping the reception unit and computing, by using the correlation computation processing unit, a correlation value for searching for and tracking the position information satellite based on the reception signal stored;

in a part of a fourth period, operating the reception unit and storing the reception signal in the storage unit; and in another part of the fourth period, stopping the reception unit and computing, by using the correlation computation processing unit, a correlation value for searching for and tracking the position information satellite based on the reception signal stored, the third period and the fourth period being consecutive in this order at a given time interval, wherein a time duration of the part of the third period is same as a time duration of the part of the fourth period, a time duration of the other part of the third period is same as a time duration of the other part of the fourth period, the time duration of the part of the third period and the time duration of the part of the fourth period is shorter than a time duration of the first period, and the time duration of the other part of the third period and the time duration of the other part of the fourth period is shorter than a time duration of the second period.

5. An electronic device comprising the satellite signal reception device according to claim 1.

6. The electronic device according to claim 5, comprising a battery configured to drive the satellite signal reception device.

* * * * *